United States Patent
Koschel et al.

(10) Patent No.: US 7,159,952 B2
(45) Date of Patent: Jan. 9, 2007

(54) AUTOMATIC BALANCING DEVICE

(75) Inventors: Christian Koschel, Augsburg (DE); Rolf Spangenberg, Gauting (DE); Eberhard Lang, Stuttgart (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 11/079,728

(22) Filed: Mar. 14, 2005

(65) Prior Publication Data

US 2005/0206217 A1   Sep. 22, 2005

(30) Foreign Application Priority Data

Mar. 17, 2004   (DE) .................... 10 2004 012 976

(51) Int. Cl.
  *B60B 27/00*   (2006.01)
  *F16F 15/22*   (2006.01)
(52) U.S. Cl. .................... 301/5.22; 74/571.1; 74/574.2
(58) Field of Classification Search ................ 301/5.21, 301/5.22; 74/573.13, 574.2
  See application file for complete search history.

(56) References Cited

U.S. PATENT DOCUMENTS

| | | | | |
|---|---|---|---|---|
| 3,109,321 A | * | 11/1963 | Rogers | 74/571.1 |
| 3,346,303 A | * | 10/1967 | Wesley | 301/5.22 |
| 3,410,154 A | * | 11/1968 | Deakin | 74/571.1 |
| 3,433,534 A | * | 3/1969 | Mercer | 301/5.22 |
| 3,799,619 A | * | 3/1974 | LaBarber | 301/5.22 |

* cited by examiner

*Primary Examiner*—Jason R. Bellinger
(74) *Attorney, Agent, or Firm*—Abelman, Franye & Schwab

(57) ABSTRACT

An automatic balancing device for a rotatable system includes a track (18) arranged about a rotational axis (H) of the rotatable system and having two surfaces (22a, 22b) inclined toward each other in a direction of a centrifugal force acting (F) acting on at least one balancing body (20) which is received in a cross-section formed by the two inclined surfaces (22a, 22b) and limited by an elastic locking element (24) arranged therebetween for displacing the at least one balancing body (20) away from the inclined surfaces (22a, 22b) in a direction opposite the direction of the centrifugal force (F) and for pressing the at least one balancing body (20) against an inner boundary of the track (18) for locking the balancing body (20) when a rotational speed of the system is below a predetermined threshold.

7 Claims, 2 Drawing Sheets

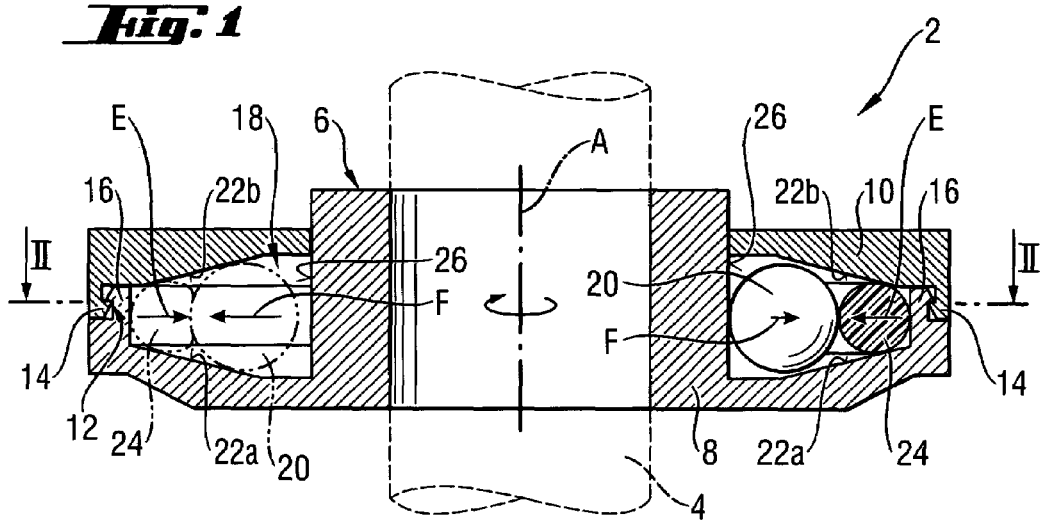
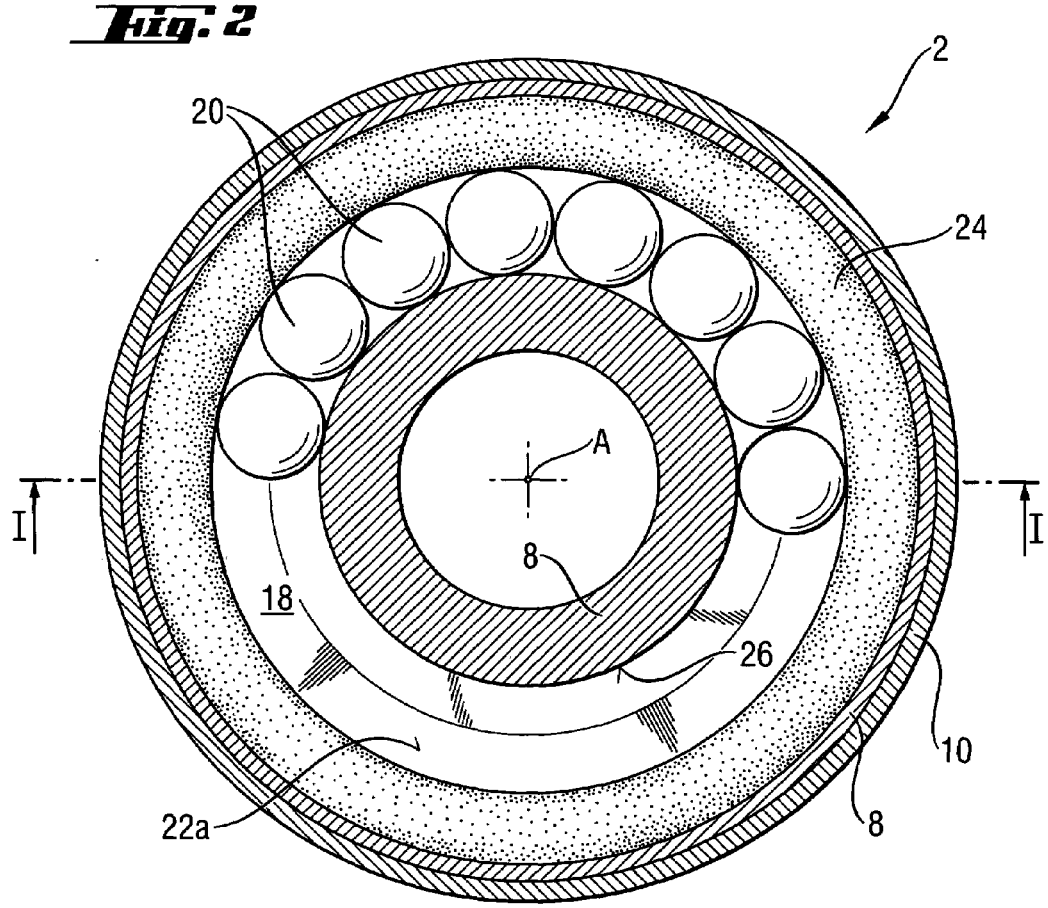

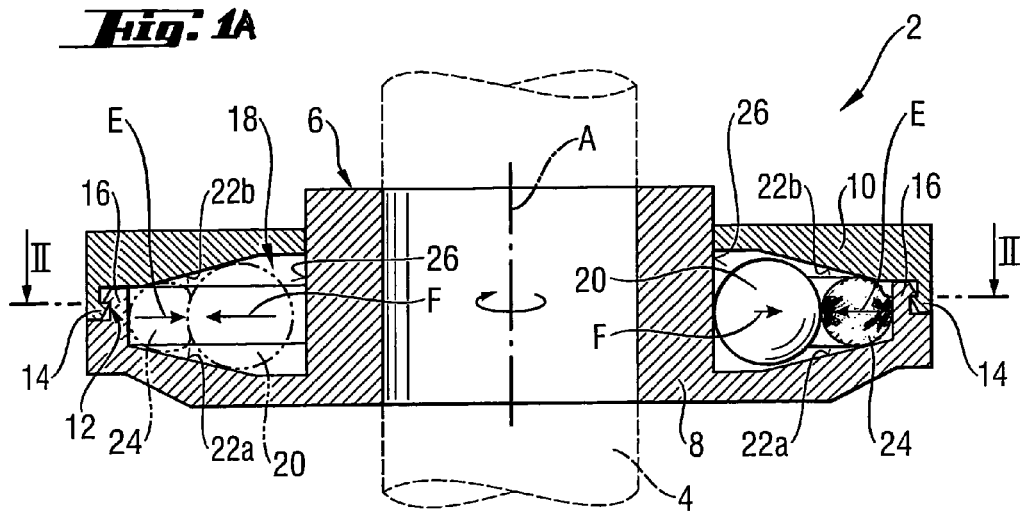

AUTOMATIC BALANCING DEVICE

BACKGROUND OF THE INVENTION

1. Field of the Invention

The present invention relates to an automatic balancing device for a rotatable system, in particular, for a hand-held tool such as, e.g., an angular grinder, and including a track which is arranged about the rotational axis of the rotatable system and in which at least one balancing body is displaceably arranged, and an elastic resilient element that presses the at least one balancing body against an inner boundary of the track when the rotational speed of the system is below a predetermined threshold, in order to lock the at least one balancing member against the track inner boundary.

2. Description of the Prior Art

In balancing devices of the type described above, the at least one balancing body is automatically displaced along the track during the operation of the system under the action of forces acting thereon into a position in which it balances the imbalance of the system. When the rotational speed of the system is below a predetermined threshold, the influence of the gravity force of the balancing body is so great that it cannot be held in its balancing position only under the action of centrifugal forces acting thereon. At the low rotational speed and at a standstill, the balancing body is held in its balancing position during operation with aid of locking means. In this way, a lasting good balancing of the rotatable system is insured at all rotational speeds of the rotatable system.

U.S. Pat. No. 3,799,619 discloses a device for damping vibrations and having a track in which a plurality of ball-shaped balancing bodies is arranged. The balancing bodies roll along two rail-shaped O-rings that press the balancing bodies against an inner wall at a standstill. In this way, the balancing bodies become locked at the standstill or at low rotational speeds. At high rotational speeds, the balancing bodies are pressed against the O-rings under the action of centrifugal forces with such a force that the balancing bodies are not pressed any more against the inner wall and can, therefore, move along the track. The balancing bodies roll over a roll-off wall of the housing between the O-rings into a balancing position.

The drawback of the known device consists in that the balancing bodies during operation are supported in the axial direction by the elastic O-rings. As a result, the guidance of the balancing bodies is not sufficiently stable. In addition, in particular at high rotational speeds, the pressure, which the balancing bodies apply to the roll-off wall, is relatively high, which can lead to noticeable wear. At that, the greater part of the abrasive particles is retained between the O-rings and the roll-off wall. This leads to disturbances during rolling of the balancing bodies along the roll-off wall. All in all, the construction of the known device is such that disturbances and inaccuracies often occur, which can result in a not sufficient balancing of the imbalance and in reduction of the service life of the balancing device and the rotatable system. Moreover, the assembly of such devices is associated with relatively large costs.

Accordingly, an object of the present invention is to provide a balancing device in which the foregoing drawbacks are eliminated.

Another object of the present invention is to provide a balancing device having an extended service life.

SUMMARY OF THE INVENTION

These and other objects of the present invention, which will become apparent hereinafter, are achieved by providing a balancing device in which the track has two surfaces inclined toward each other in a direction of a centrifugal force acting on the at least balancing body during rotation of the system, forming a cross-section for receiving the at least one balancing body, and tapering in the direction of the centrifugal force acting on the at least one balancing body, and the elastic locking element borders the track, with the elastic locking element being located between the inclined surfaces and preloading the at least one balancing body in a direction away from the inclined surfaces in a direction opposite the direction the centrifugal force acts on the at least balancing body, pressing the at least one balancing body against an inner boundary of the track.

Accordingly during the rotation of the system with a rotational speed above a predetermined threshold, the balancing body is pressed against the elastic locking element under the action of the centrifugal forces acting on the balancing body, and comes into contact with the inclined surfaces. Simultaneously, rolling of the balancing body over the two inclined surfaces reduces wear, on one hand. On the other hand, the inclined toward each other, surfaces automatically center the balancing body. Further, due to the included arrangement of the these surfaces, the possible abrasive particles move away from the contact region between the balancing body and the these surfaces, the possible abrasive particles move away from the contact region between the balancing body and the inclined surfaces.

In this way, during rotation of the system, the balancing body is stably and precisely displaced in its balancing position and is held there. Moreover, a precisely preset, by the elastic locking element, initial balancing position is retained at rotational speeds below the predetermined threshold. This increases the service life of both the system and the balancing device.

Advantageously, the elastic locking element is formed as a single O-ring, which simplifies the assembly of the balancing device and reduces the manufacturing costs.

Preferably, the elastic locking element is formed of foam rubber or felt. The relatively rough surface of these materials provides a certain inertia during rolling of the balancing body, which insures a stable locking of the balancing body in its balancing position.

In a particular advantageous embodiment of the inventive balancing device, the track is formed in a housing formed of at least two parts. This insures a particular easy assembly of the inventive balancing device, and further reduces manufacturing costs.

Advantageously, the two inclined surfaces are formed on two parts, respectively. This insures an easy formation of the inclined surfaces and, again, reduces the manufacturing costs.

Advantageously, the two housing parts are formlockingly connected with each other. (Formlocking connection is a connection which is formed by complementary shaped elements of two parts.) This, on one hand, further facilitates the assembly of the inventive balancing device. On the other hand, the damage of the elastic locking assembly during the assembly of the balancing device is prevented, as it otherwise might have been the case if the two parts were connected, e.g., by welding. The temperature variations could have damage the elastic locking element.

It is particular advantageous when the formlocking connection is formed by a locking device which insure a rapid and easy assembly.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiment, when read with reference to the accompanying drawings.

BRIEF DESCRIPTION OF THE DRAWINGS

The drawings show:

FIG. 1 an axial cross-sectional view of a balancing device according to the present invention along line I—I in FIG. 2, with an elastic locking element formed of rubber;

FIG. 2 a view similar to that of FIG. 1 but with the elastic locking element formed of rubber; and FIG. 2 a radial cross-sectional view of the balancing device according to the present invention along plane II—II in FIG. 1.

DETAILED DESCRIPTION OF THE PREFERRED EMBODIMENT

A balancing device 2 according to the present invention for an automatic balancing of imbalance of a, rotatable about axis A, system in form of a tool spindle 4, shown with dash lines, e.g., of an angular grinder, is shown in FIGS. 1–2 and includes a two-part housing 6 mountable on the tool spindle 4 for joint rotation therewith. The housing 6 has a base part 8 and a cover part 10 which are formlockingly connected with each other by a locking device 12. The locking device 12 has resilient locking means 14 in form of a circumference of the cover part 10 and has a hook-shaped cross-section. The resilient locking means 14 lockingly engages counter locking means 16 which is provided on the base part 8. The counter locking means 16 is likewise formed as a circumferential rim having a hook-shaped cross-section.

The housing 6 forms, in its interior, a circumferential track 18 about the axis A and in which ball-shaped balancing bodies 20 are arranged. The track 18 is limited, in a radial direction from the axis A, by two inclined inclined surfaces 22a, 22b between the base part 8 and the cover part 10. The inclined surfaces 22a, 22b are formed, respectively, on the base part 8 and the cover Part 10. The O-ring 24 is formed of an elastic material such as foam rubber and felt. Adjacent to the axis A, the track 18 is formed by a circumferential inner wall that acts as an inner boundary 26.

FIG. 2 and the right side of FIG. 1 show the balancing device 2 at a standstill of the tool spindle 4, e.g., when the tool spindle 4 has a low rotational speed. In this position of the balancing device 2, the balancing bodies 20 are pressed against the inner boundary 26 with a biasing-force E of the O-ring 24 and cannot move along the track 18. The balancing bodies 20 are held stationary with the O-ring which acts, thus, as locking means.

With increase of the rotational speed of the tool spindle 4 and the balancing device 2 up to a predetermined threshold value, the balancing bodies 20 are pressed against the elastic O-ring 24 as a result of centrifugal force F acting thereon so far that they become spaced from the inner boundary 26 and, therefore, can move along the track 18, as shown at the left side of FIG. 1 with dash-dot liens. The balancing bodies 20 contact the roll-off surfaces 22a, 22b and are centered thereby. The balancing bodies 20 roll off the inclined surfaces 22a, 22b into a balancing position about the gravity center of the rotable system in order to balance the rotatable masses.

The relatively rough and elastic surface of the O-ring 24, which is formed of the foam rubber or felt, provices for a certain inertia of the balancing bodies 20 so that they would be held in their balancing position relatively stable.

When the rotational speed of the tool spindle 4 is reduced below the predetermined threshold value, the biasing force E of the O-ring 24 becomes greater than the centrifugal force F acting on the balancing bodies 20, as shown at the right side of FIG. 1 by lengths of respective arrows. As a result, the balancing bodies 20 would be pressed by the O-ring 24 against the inner boundary 26 and would occupy the previously set balancing position in the housing 6. Thus, the rotatable system is balanced relatively precisely also at low rotational speeds.

When the balancing device 2 is mounted on the tool spindle 4, firstly, the O-ring 24 and the balancing bodies are placed in the base part 8. Then, the cover part 10 is placed on the base part 8 and is pressed there against until the locking means 14 snaps beneath the counter locking means 16, whereby the locking device 12 becomes locked.

Though the present invention was shown and described with references to the preferred embodiment, such is merely illustrative of the present invention and is not to be construed as a limitation thereof and various modifications of the present invention will be apparent to those skilled in the art. It is, therefore, not intended that the present invention be limited to disclosed embodiment or details thereof, and the present invention includes all variations and/or alternative embodiments within the spirit and scope of the present invention as defined by the appended claims.

What is claimed is:

1. An automatic balancing device (2) for a rotatable system, comprising:

a track (18) arranged about a rotational axis (A) of the rotatable system;

at least one balancing body (20) displaceably arranged in the track (18), the track (18) having two surfaces (22a, 22b) inclined toward each other in a direction of a centrifugal force (F) acting on the at least one balancing body (20) during rotation of the system and defining a cross-section for receiving the at least one balancing body (20); and elastic locking means (24) arranged along the track (18) between the inclined surfaces (22a, 22b) for limiting the cross-section defined by the inclined surfaces (22a, 22b) and for displacing the at least one balancing body (20) away from the inclined surfaces (22a, 22b) in a direction opposite the direction the centrifugal force (F) acts on the at least one balancing body and pressing the at least one balancing body (20) against an inner boundary (26) of the track (18), whereby the at least one balancing body (20) becomes locked when a rotational speed of the system and, thereby, the centrifugal force (F) acting on the at least one balancing body (20) are below predetermined thresholds for the rotational speed and the centrifugal force.

2. An automatic balancing device according to claim 1, wherein the elastic locking means comprises a single O-ring (24).

3. An automatic balancing device according to claim 1, wherein the elastic locking means is formed of one of foam rubber and felt.

4. An automatic balancing device according to claim 1, further comprising a housing (6) formed of at least two parts (8, 10), and wherein the track (18) is provided in the housing (6).

5. An automatic balancing device according to claim 4, wherein the two inclined surfaces (22a, 22b) are formed in the two parts (8, 10) forming the housing (6), respectively.

6. An automatic balancing device according to claim 4, further comprises means for formlockingly connecting the at least two parts (8, 10) forming the housing (6).

7. An automatic balancing device according to claim 6, wherein the formlockingly connecting means comprises a locking device (12).

\* \* \* \* \*